United States Patent [19]

Muir

[11] Patent Number: 4,486,866

[45] Date of Patent: Dec. 4, 1984

[54] SEISMIC EXPLORATION USING NON-IMPULSIVE VIBRATORY SOURCES ACTIVATED BY STATIONARY, GAUSSIAN CODES, AND PROCESSING THAT RESULTS IN DISTORTION-FREE FINAL RECORDS PARTICULARLY USEFUL IN STRATIGRAPHIC TRAP DETERMINATION

[75] Inventor: Francis Muir, Laguna Niguel, Calif.

[73] Assignee: Chevron Research Company, San Francisco, Calif.

[21] Appl. No.: 316,006

[22] Filed: Oct. 28, 1981

Related U.S. Application Data

[63] Continuation-in-part of Ser. No. 117,689, Feb. 1, 1980, Pat. No. 4,346,461.

[51] Int. Cl.$^3$ .......................... G01V 1/20; G01V 1/36
[52] U.S. Cl. ..................................... 367/39; 367/100; 364/421
[58] Field of Search .................. 367/39, 41, 55, 60, 367/100, 905; 343/100 CL; 364/421, 717, 728

[56] References Cited

U.S. PATENT DOCUMENTS

| | | | |
|---|---|---|---|
| 3,697,938 | 10/1972 | Taver | 367/39 |
| 3,863,058 | 1/1975 | Savit | 367/41 |
| 4,023,026 | 5/1977 | O'Farrell | 364/717 |
| 4,047,172 | 9/1977 | Bower et al. | 343/17.1 R |
| 4,049,077 | 9/1977 | Milsud | 367/39 |
| 4,054,862 | 10/1977 | Bochman | 367/100 |
| 4,064,481 | 12/1977 | Silverman | 367/40 |
| 4,156,876 | 5/1979 | Defussier | 364/428 |
| 4,189,704 | 2/1980 | Martin et al. | 367/60 |
| 4,234,053 | 11/1980 | Erich | 367/55 |

FOREIGN PATENT DOCUMENTS 0720392  3/1980  U.S.S.R. ................. 367/39

OTHER PUBLICATIONS

Bernhardt et al., "Encoding Techniques for the Vibroseis System," 3/78, Geophy. Prop., vol. 26, #1.
Barbier, "Sosia, A New Seismic Method", 11/12/70, pp. 1–23, Mtg. of Soc. of Expl. Geophy.
Evisar, "The Pulsed Vibrator as a Seismic Source", 6/57, pp. 383–391, 12th Mtg. of Europ. Assoc. of Expl. Geophys.

*Primary Examiner*—Nelson Moskowitz
*Attorney, Agent, or Firm*—Edward J. Keeling; H. D. Messner

[57] ABSTRACT

The disclosed invention is a method of seismic exploration using non-impulsive vibratory sources activated by stationary, Gaussian codes. The method has the channel-capacity economy of sign-bit recording and the distortion-free quality of full-waveform seismic records, even through zero memory, non-linear representations ("ZNL's") are employed either during the collection or the processing steps that produce such final records. As a result, stratigraphic facies can be both economically and surprisingly indicated.

13 Claims, 5 Drawing Figures

FIG-1

FIG_2

FIG_3

FIG_4

FIG_5

SEISMIC EXPLORATION USING NON-IMPULSIVE VIBRATORY SOURCES ACTIVATED BY STATIONARY, GAUSSIAN CODES, AND PROCESSING THAT RESULTS IN DISTORTION-FREE FINAL RECORDS PARTICULARLY USEFUL IN STRATIGRAPHIC TRAP DETERMINATION

CROSS-REFERENCE TO RELATED APPLICATION

This application is a continuation-in-part of Ser. No. 117,689 filed Feb. 1, 1980 for "Seismic Exploration Using Vibratory Sources, Sign-bit Recording and Processing That Maximizes The Obtained Subsurface Information" assigned to the assignee of the present application, and now U.S. Pat. No. 4,346,461.

FIELD OF THE INVENTION

This invention relates to seismic exploration in which seismic vibrations, generated by one or more non-impulsive vibratory sources are injected into the earth, and subsequent vibrations are recorded by one or more detectors at a location displaced from the source. More particularly, the invention relates to the enhanced recovery of all desired seismic wave-form information even though either representations of the waves injected into the earth, or representations of the subsequent vibrations of the earth are recorded in non-linear form (i.e., say retaining only the algebraic sign of the sinusoidal signals). In a further aspect, the present invention has the surprising capability of providing identification of trends within the resulting records so as to indicate stratigraphic accumulations of oil and gas.

BACKGROUND OF THE INVENTION

The terms "stratigraphic accumulations" and "stratigraphic traps" are used herein in their broadest sense: traps that do not rely on structural or tectonic processes to bring about closure. The relevant process must therefore involve changes in the permeability and porosity of the host sediments, either by sedimentation or by metamorphic processes, say (1) silting of a sandstone body until the pore spaces are insufficiently large to allow the escape of the hydrocarbons; and (2) action of magnesium-bearing salts of, say, groundwater on limestone causing the transformation of the latter to dolomite which have a lower porosity than that of calcite again prevents the escape of the oil and gas.

Since such traps are not usually associated with large acoustic contrasts, mapping by conventional methods (such as by measuring changes in the arrival time of the associated reflection) cannot be done. Hence, indirect analytical methods are required. For example, time differences and changes in reflection wave shapes of traces associated with the interval of interest, are most often used, but with limited success due, inter alia, to the fact that resolution requires that the compared traces be essentially distortion-free, after processing has occurred.

The term "distortion-free, after processing" to describe the final records relates to the fact that there should be no undesired change in waveform either of the recorded field signals or of the final data after processing has been completed.

Prior to my invention, such distortion could be brought about (i) by the use of sign-bit recording techniques in the field as described hereinafter, (ii) by data processing procedures as where power spectrum of the collected data is provided using conventional processing methods, or (iii) accidentally, where components of the system do not linearly interface the input and output signals, as when the injected seismic signal exceeds the dynamic limits of the recording system so that signal clipping invariably results.

Doty et al, U.S. Pat. No. 2,688,124 issued Aug. 31, 1954 for "Method and Apparatus for Determining Travel Time of Signals" describes the well-known Vibroseis® system of Continental Oil Company. In such a system, seismic waves are generated by mechanical vibrators on the earth's surface. Each of the vibrators is firmly anchored to the earth, by the combined weight of the source. Peak forces in the neighborhood of 10 to 20 tons (and up to 36 tons) can be developed by the rapid non-explosive interaction of the base-plate and piston system of each vibrator. Consequently, the weight of each vibrator is proportionally large to maintain the desired continuous vibrator-earth contact during operations. The waves sent into the earth consist of long sinusoidal wave trains of predetermined frequency and time duration characteristics rather than the much sharper wave impulses sent into the earth by the explosive sources used prior to the Vibroseis® system, or by "weight drop" methods including those provided by various impulse coded systems, e.g., the so-called pulse-coded techniques.

There may be some confusion as to the differences of the signals produced by the Vibroseis® system and those produced by impulsive sources such as provided by exploding dynamite exploding mixtures of propane and air, or by "weight drop" methods including pulse-coded techniques.

It is well known that the capacity of any signal (including seismic signals) to carry information can be measured in a manner analogous to determining the volume of a container. Since volume is the product of height times width times length, similarly information capacity of a signal is related to a product of amplitude, frequency bandwidth and the length of the signal.

Dynamite as an seismic energy source produces an input signal having considerable amplitude (height), and bandwidth but has very short length. On the other hand, "non-impulsive" vibrations generated in the manner of a Vibroseis® system have limited amplitude, but such is compensated for by the long length of the input signal and a faithful continuous reproduction of the control signal over the frequency spectrum of interest. That is to say, in the Vibroseis® system the amplitude and phase spectra is carefully and continuously controlled so that the resulting energy spectra changes smoothly as a function of time. Thus, a smoothly varying output of desired frequency and duration characteristics is provided in contradistinction to the binary-coded (ON-OFF) squarewave output generated by pulse-coded methods in which the energy per blow is substantially constant and cannot be so controlled.

A further essential part of the Vibroseis® system lies in the processing of the received data to produce records that tend to show short pulses representing reflections from subsurface interfaces. Such responses are provided by cross-correlating the recorded representation of the vibratory waves sent into the ground with the recorded representation of the waves received subsequently.

The use of cross-correlation as taught by Doty et al and many others since, has now become so well known in vibratory seismology that it will be presumed to be well known in the following parts of the present specification; and the description will concern itself only with differences from the prior art.

Erich, U.S. Pat. No. 4,234,053 for "Seismic Exploration Method Using a Rotating Eccentric Weight Seismic Source", describes an exploration method in which a rotating eccentric weight source is used (as a power impactor) to transmit a coded, non-Gaussian impulse input signal into the earth on a substantially constant energy per blow basis. An improved representation of the pulsed input signal is correlated with the raw seismic data to provide the field record of interest. But since the impulsive source is also only discontinuously coupled to the earth (i) the interaction of the mass of the eccentric weight source with the spring constant of the earth produces an output dominated by low frequency components and (ii) the pulse shape of the output can vary nonlinearly with time. Hence such system is limited to those uses where a conventional Vibroseis® system cannot be employed.

Multi-array use of such sources is likewise limited.

Martin et al, U.S. Pat. No. 4,058,791 issued Nov. 15, 1977 "Method and Apparatus for Processing Seismic Signals from Low Energy Sources" is directed to an effort to solve the growing problem of handling all the information collected in a modern seismic survey. It is now desired to collect information from hundreds, and sometimes even thousands, of receivers, feeding into tens, and sometimes even hundreds, of recording channels. Martin et al recognize that some essence of the seismic information is preserved if only the algebraic signs of the incoming signals, and not the full waveforms are recorded. Using information channels that need to handle only sign-bits makes it possible to use several times as many channels for the same recording and processing capacity.

Also, Martin et al observed that in some of their vibratory seismic work, that when sign-bit representations of the source waves were cross-correlated with sign-bit representations of the received waves, the resulting cross-correlation functions appear to be similar to cross-correlation functions from full waveform inputs, provided that the resulting correlation functions are "common depth point stacked" to a high multiplicity ("the CDP fold is at least 40"). However, it is to be particularly noted that Martin et al use a conventional "chirp" source signal to generate vibrations. Furthermore, Martin et al indicate that where their stacked final records appeared similar to conventional stacked records using 16-bit recording, they were referring to work of their predecessors, such as Fort et al, U.S. Pat. No. 3,883,725, issued May 13, 1975, "Data Compositing and Array Control System", who added certain "shifting functions" to the received signals before the received signals were clipped. The requirement for high order stacking is objectionable because the large number of information channels required to produce a single stacked output trace tends to cancel out the very advantage for which sign-bit recording is used, its channel-capacity economy. A large number of low capacity channels can require just as much recording and processing capacity as a small number of high capacity channels. Addition of the "shifting functions" is objectionable. It does not improve records in the general case, even though it may have some value in certain limited circumstances (e.g., with low signal-to-noise-ratio signals). So the similarities noted by Martin et al between the cross-correlation function from their sign-bit recordings and cross-correlations from full waveform recordings depended on special circumstances not desirable to produce, or to encounter, in general seismic exploration work.

There is a further disadvantage of the Martin et al technique; they had no measure of the similarity they noticed. The results could not be stated in mathematical terms which would indicate how much information had been discarded in the clipping operation (the conversion to sign-bits) and whether or not the discarded information was essential.

Another relevant patent is that of Crook et al, U.S. Pat. No. 3,264,606, Aug. 2, 1966 "Method and Apparatus for Continuous Wave Seismic Prospecting" which teaches driving of vibratory sources (in conjunction with conventional full-wave recording equipment) with pseudo-random codes which, although differing in detail from the preferred codes prescribed here, does share the desirable generic property of "a code sequence which may be represented as a reference time series having a unique auto-correlation function comprising a single major lobe having no side lobes of greater amplitude than the side lobes of the auto-correlation function of statistically unrelated noise components of the composite signal detected at said detecting location" (Column 13, lines 32-44).

In my parent application for "Seismic Exploration Using Vibratory Sources, Sign-bit Recording, and Processing that Maximizes the Obtained Subsurface Information", filed Feb. 1, 1981, Ser. No. 177,689 assigned to the assignee of the present application, I describe a non-impulsive vibratory system that uses a class of vibrator signals best characterized as Gaussian, zero mean, and stationary, in conjunction with sign recording of both the injected and received vibrations at the sources and receivers. The stated advantages relate to the channel-capacity economy of sign-bit recording (at both the sources and receivers), and to the distortion-free quality of the final processed records.

I have now discovered that use of the above-class of vibrator signals not only does not sacrifice information in the final processed records nor reduces their distortion-free quality, (even though the data is collected by sign-bit recording methods) but also such type of vibrator signals also favorably impacts all classes and types of non-linear seismic recording and processing operations (typically classed as zero-memory, non-linear operations, or ZNL's).

Aside from the above, a paper of A. B. Cunningham, *Geophysics,* December 1979, Vol. 44, No. 12, pages 1901 et seq for "Some Alternate Vibrator Signals" works out in mathematical detail expected types of cross-correlation functions from various types of vibrator sweeps, including certain types of pseudo-random sweeps, but not in the context used herein.

SUMMARY OF THE INVENTION

The present invention does not depend upon high order stacking or the use of extraneous imposed signals. Instead, the present invention uses a class of vibrator signals best characterized as Gaussian, zero mean, and stationary, in conjunction with zero-memory, non-linear recording. I.e., either the injected and received vibrations originating at the sources and receivers respectively, are recorded in non-linear form (e.g., retaining only the algebraic sign). The method of the invention can make use of the information channel-capacity economy of the sign-bit method. Subsequent cross-correlation of the representation of the Gaussian vibrations with the representation of the received vibrations, provides cross-correlation records that are actually provably superior in expectation to cross-correlation records that use sign-bit recorded data from conventional seismic sources, due, inter alia, to the fact that use of Gaussian, zero mean and stationary vibrations completely invert usual seismic signal processing and recording requirements. Result: the final records are distortion-free irrespective of non-linear operations occurring in either the collection or processing mode of such records.

In one aspect, the distortion-free nature of the final record results from the injection of the above-identified Gaussian vibrations into the earth (rather than a conventional "chirp" signal of predetermined frequency and time duration characteristics) and recording a representation of the injected signals in zero-memory, non-linear form, say by retaining the algebraic sign of such signals. Reflected signals are next recorded at the array of receivers using full-wave preservation methods, and thereafter processed using conventional correlation techniques. Thus, absolute scale of each received trace is maintained.

In another aspect, the distortion-free nature of the final record also results from injecting the above-identified Gaussian vibrations into the earth and recording a full-wave representation of the injected signal. The reflected signals are then recorded in zero-memory non-linear form and then cross-correlated with the full-wave represented injection signal.

In both cases, since the final correlation record, is surprisingly distortion-free, they have a superior capability, of, say, indicating stratigraphic traps associated with the surveyed earth formation.

These and other features and advantages of the present invention will become evident to exploration seismologists in the light of the following specification, including the appended drawings briefly described here.

DETAILED DESCRIPTION OF THE INVENTION

Figure 1:
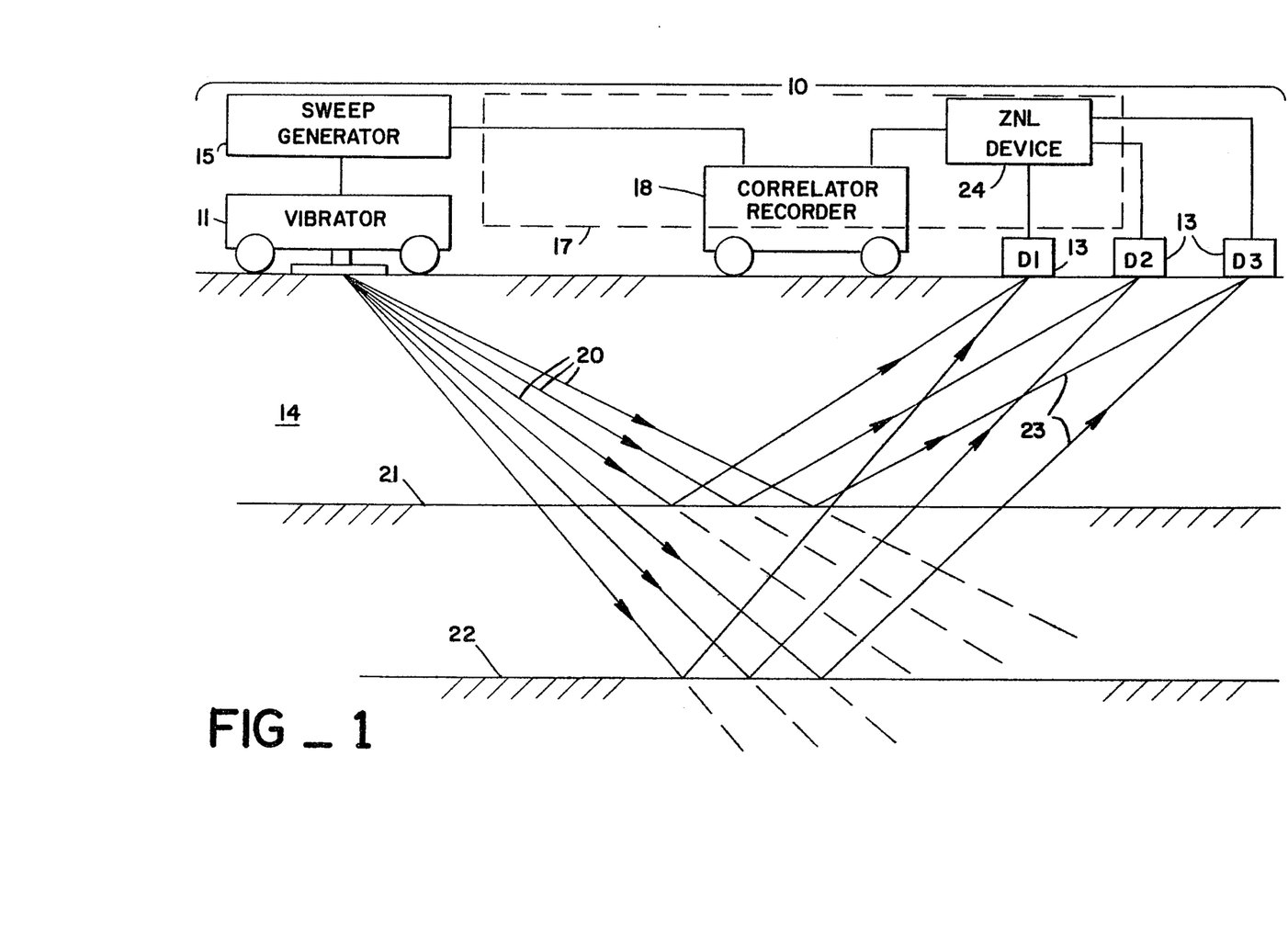
FIG. 1 is a side elevation of an earth formation, and shows major pieces of apparatus used in a survey system for carrying out the present invention, the survey system including a vibratory source adapted to be driven by a Gaussian, zero mean, stationary code, a series of detectors arranged to receive the propagated portions of the injected vibrations, and processing and recording means for the generated and recorded signals.

Refer now to FIG. 1, 10 illustrates the survey system of the present invention. System 10 includes vibratory source 11 positioned at a location distant from a series of detectors 13. In operation, vibratory source 1 injects seismic vibrations in a continuous and nonimpulsive manner into the earth formation 14. Amplitude-versus-time characteristics of the vibrations of the source 11, vary over a predetermined time duration and frequency spectrum, under control of a control signal generated by sweep generator 15. The sweep control signal fed to vibratory source 11, is also fed through a separate information channel to processing and recording unit 17.

Figure 2:
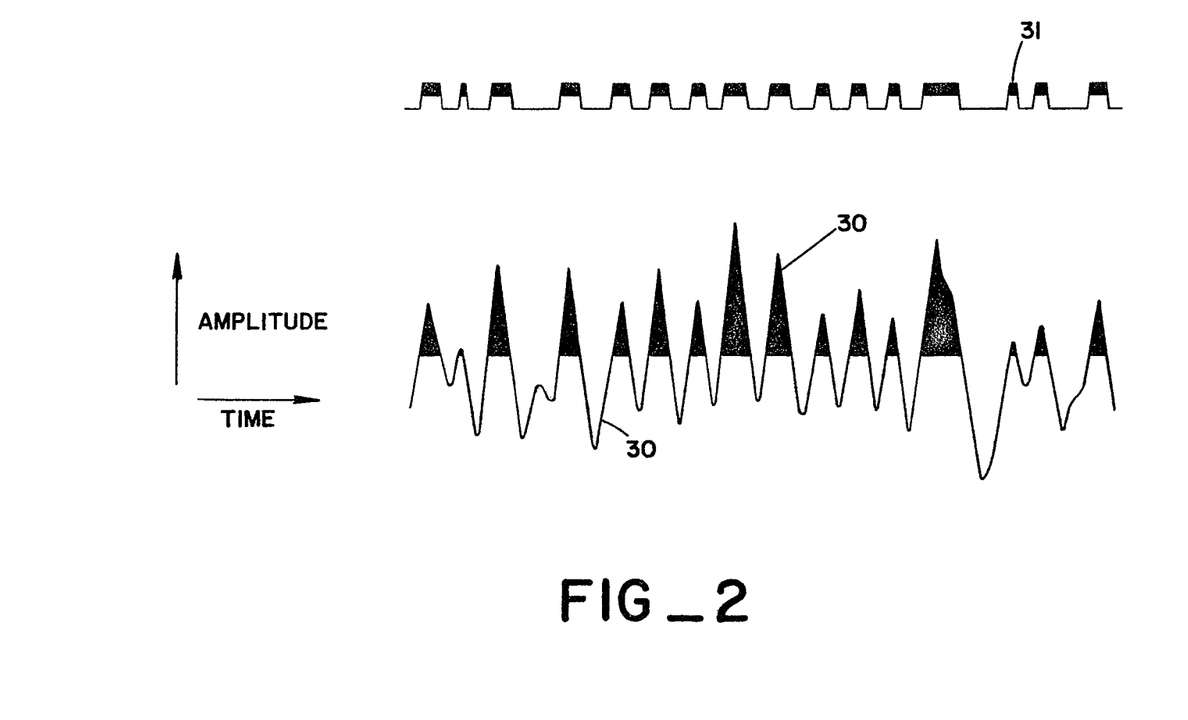
FIG. 2 illustrates both a full-wave version of a recorded signal and a clipped, or sign-bit version, of that same signal generated by the system of FIG. 1.

In FIG. 1 the vibratory waves going into earth formation 14 are represented by ray paths 20, the waves traveling obliquely downward toward a pair of stratal interfaces 21, 22 where they undergo partial reflection and travel back upwards along paths 23, again obliquely, toward the series of detectors 13 at earth's surface 12. While only three symbolic detectors are shown in FIG. 1, in actual current field practice, hundreds of detectors may be employed. From detectors 13, the final operations represented in FIG. 1 are transmission of full waveform data through a zero-memory, non-linear device ("ZNL") 24 to the correlator and recorder unit 18 of the processing and recording circuit 17. In the correlator and recorder unit 18, cross-correlations are made of the received data and full-wave representations of the injected vibratory sweeps. The purpose of the ZNL device 24 is to convert the received data into a zero-memory, non-linear representations thereof, say by retaining only the algebraic sign of the received signals, i.e., "sign-bits". An illustration of such zero-memory, non-linear operations is shown in FIG. 2. The representations are then transmitted to correlator and recorder unit 18.

Reference is now made to FIG. 2, which illustrates both a full-wave-form 30 and its zero-memory, non-linear clipped version 31 as provided by ZNL device 24 of FIG. 1. All of the wave loops in the clipped version have been cut off just above or just below the horizontal axis, so that only the sign-bits are retained.

As has already been mentioned, when waveforms of the vibrator and detector are cross-correlated and stacked with a high multiplicity, the stacked cross-correlations appear similar to the stacked cross-correlations made with full waveforms. But the mere appearance of similarity has not convinced seismologists in general that all the desirable information is still there after clipping.

In the present invention, it is possible, moreover, to state that for most currently practiced seismic exploration—if those specified types of driving functions are used—none of the usually-used seismic information will be sacrificed in the zero-memory, non-linear clipping operation.

The physical steps of the present invention, when properly combined, make possible the utilization of the theoretically-provable, maximum amount of information that can be recovered from correlated waveforms.

That it should be possible to recover all information from correlations of a zero-memory, non-linearly clipped-waveform representations of a stationary, zero mean Gaussian function was obliquely implied in theoretical results obtained by Van Vleck and Bussgang. These results are concerned with noise for the purpose of data communication and, to my knowledge, has remained relatively unknown among exploration geophysicists. Their geophysical implications require an unobvious twist of thought in that it is necessary to think of Van Vleck's and Bussgang's "noise" as a possible seismic "signal", just the opposite from what would then be called the "noise" in the seismic context. (Chapters 5 and 6, e.g., *An Introduction to Statistical Communication Theory*, J. B. Thomas, John Wiley & Sons (1969), are seen to express "noise" and "signal" in such conventional terms).

The results of Van Vleck and Bussgang that bear upon the present invention are equations given here in notation different from that originally used notation but more like that used in current theoretical seismology.

Van Vleck's result can be stated as follows:

Let

W, Y, be stationary jointly-Guassian zero mean random processes;

k(.) be the clipping function which is characteristic of sign-bit recording;

and X (.,.) be the normalized cross-correlation function, meaning it is scaled down by the product of the RMS levels of Y and W. (Thus, such functions contain no information about absolute amplitude.)

Then $$X(W,Y) = \sin((\pi/2)X(k(W), k(Y)) \quad (1)$$

In words, equation (1) states that given two input signals (W and Y) with the right properties, their cross-correlation X(W,Y) is the same (except for the mapping implied by the Sine function) as a scaled cross-correlation of the clipped versions of the input signals, k(W) and k(Y).

To see application of Van Vleck's result to seismic prospecting, reference should be made to my parent application, op. cit., in which W is a vibrator sweep and Y is the uncorrelated data recorded at a particular geophone. In that case X(W,Y) represents the correlated output of a standard true amplitude recording system (i.e., no clipping anywhere in the system) and X(k(W), (Y)) represents the normalized correlated output of a system in which the data is clipped as it comes in at the geophone and then is correlated with a clipped sweep. Interpreted in this fashion, Van Vleck's result implies that if the sweep and the recorded data have the right properties, data can be recorded with a sign-bit system with no distortion except loss of absolute trace amplitude information. Absolute trace amplitude is lost because Van Vleck's result applies to normalized cross-correlations. The amplitude loss is the same as that which occurs when data are trace equalized using a single gate containing the whole trace. It is not equivalent to an AGC operation.

Bussgang's result can be stated as follows:

Let

W, Y be stationary, jointly-Gaussian, zero-mean random processes (continuous in nature or sampled representations of such continuous processes);

X(.,.) be the cross-correlation operator; and k(.) be a characteristic of any zero-memory nonlinear device (i.e. k is a fixed mapping function or table that converts input values to output values but not necessarily one-to-one, e.g. a clipping function).

Then $$X(W,Y) = a; X[W,k(Y)] = b; X[k(W), Y] \quad (2)$$

where a and b are constants depending only on k and the sequence affected by k.

In words, equation (2) states that given two input signals (W and Y) with certain properties, their cross-correlation X(W,Y) is unaffected, except to a scale factor, by any distorting mechanics that either one might suffer during collection.

Figure 4:
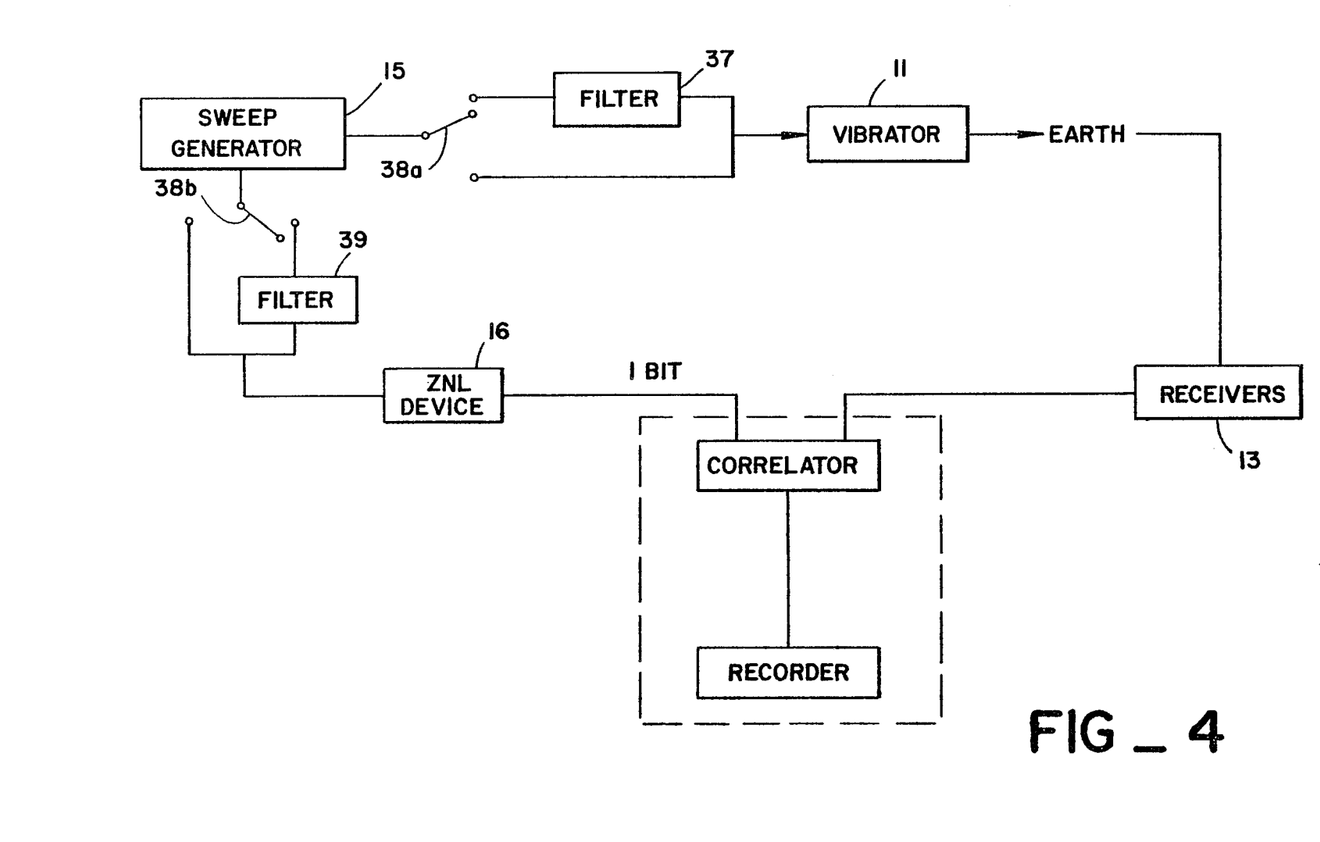
FIG. 4 is a schematic diagram in block form of the system of FIG. 1 showing alternate paths along which signal information may flow, in accordance with the present invention.

In such case X(W,Y) represents the correlated output of a true amplitude recording system (i.e., without zero-memory, non-linear distortion); a X[W,k(Y)] represents the correlated output of a system in which the data undergoes zero-memory, non-linear distortion as it comes through the geophone, say, when acted upon by ZNL device 24 of FIG. 1, and then is correlated with an unclipped sweep signal; and b X[k(W,Y] represents the correlated output of a system in which the sweep undergoes zero-memory, non-linear distortion, say, at ZNL device 16 of FIG. 4, and then is correlated with the unclipped output of the geophone.

Interpreted in this fashion, we can distinguish the two cases where:

(i) Y, the recorded signal, is subjected to the nonlinearity, k, before correlation; and (ii) W, the source signal, is subjected to k before correlation.

These results apply directly to seismic prospecting where W is the motion of a vibratory source and Y is the consequent motion of the earth picked up by a geophone of a series of geophones.

In this case it is well known that W and Y are related through the usual convolutional equation:

$$Y = E*W + N \quad (3)$$

where E is the impulse response of the earth and N represents any uncorrelated noise present at the geophone.

Interpreted in this fashion, the extension of Bussgang's result to seismic prospecting implies that if the sweep and recorded data have the right properties, nonlinear operations produce no distortion; but in case (i), above there is a loss of absolute trace amplitude information. Absolute amplitude data is lost because Bussgang's extension applies to normalized cross-correlations. The loss is the same as that which occurs when data are trace equalized using a single gate containing the whole trace. It is not equivalent to an AGC operation. In case (ii) the correlated output is undistorted and, since the scaling constant is only a function of the particular non-linearity and the particular sweep statistics, if these are held constant from profile-to-profile, then true scaling both for the traces within a profile and for the traces from different profiles, is assured.

OPERATIONAL STEPS OF THE INVENTION

With the above as a guide, briefly, the operational steps of method of the present invention may now be specified using vibratory sweeps and ZNL recordings, so as to produce final cross-correlation traces that are surprisingly distortion-free and so are superior to conventional sing-bit cross-correlation traces. In accordance with method aspects, a preferred embodiment of the present invention includes the steps of:

A. Injecting Gaussian, zero mean, stationary seismic vibrations into the earth by driving at least one vibratory source using a control code of preselected characteristics;

B. Recording either the representations of the injected seismic vibrations or the received vibrations (that have propagated through the earth from the vibratory source(s) to the receiver(s)) in zero-memory, non-linear form, e.g., retaining only their sign-bits, and C. Cross-correlating the non-linear representation of either the injected or the received seismic vibrations, with the waveform-preserved recording of the other.

The result of such cross-correlation, without more, is the seismic record of interest that is surprisingly useful in stratigraphic trap determination.

The above three steps, performed in combination, give the result never achieved before, the final cross-correlation traces that are superior to cross-correlation traces that could have been made heretofore using sign-bit recording in combination with an impulsive or a chirp source signal.

Briefly, superiority of the method of the present invention results from the fact that the use of the Gaussian stationary vibrations inverts the signal collection and processing requirements for producing distortion-free final correlated records. Thus, where the prior art performs any form of zero-memory, non-linear operation on the source or receiver signals (such a clipping operation) distortion would occur. But note that my method, all such zero-memory, non-linear operations are performed in an inverse domain (the "noise" domain) and hence do not distort the essential nature of the final seismic records.

Hence, the present invention can operate in areas where seismic white noise requirements are either (i) below the threshold required for conventional fullwave Vibroseis® recording and processing, or (ii) below that required for usual sign-bit Vibroseis® recording and processing (using a chirp signal), or, when operating in an area where the threshold conditions allow the latter system to operate, provide superior final results. ("White" noise is defined in conjunction with the visible spectrum where a uniform amount of each frequency over the visible spectrum is seen as white light. Hence, "white" noise contains a uniform amount (of noise) of each frequency over the entire frequency range.)

Within the above-identified areas of usage of the present invention, the step related to the injection of a Gaussian, zero mean, stationary signal into the earth, plays a very important role.

Hence, it is appropriate therefore to go into some detail concerning the nature of such vibrations and especially the control codes used in conjunction with sweep generator 15 to drive the vibratory source 11 of the system shown in FIG. 1.

In the art of driving vibratory sources, extensive use has already been made of activating codes embodied on magnetic tape, so it is unnecessary to discuss in detail how the activating codes are used to drive the vibratory source 11. It should be commented, however, that sufficiently detailed equipment is now presently available for this purpose. For example, in Payton, Waters and Goupillaud's U.S. Pat. No. 4,168,485 for "Simultaneous Use of Pseudo-random Control Signals in Vibrational Exploration Methods", a digital sweep generator is described that uses a digital control code to produce the desired control· signal. Essentially, the digital control signal is placed in the memory of a digital computer as digital words which can be shifted out, in seriation, to a digital-to-analog converter. The converter, in turn, generates an alternating signal to drive the vibratory source, such a vibratory source 11. The output signal from the D/A converter is initially in the form of a series of stepped electrical functions in which amplitude changes, in steps, as a function on incremental time change. But after smoothing via a filter, the stepped signal becomes a more conventionally looking alternating control signal those amplitude varies smoothly with time, to provide the desired output signal.

It should also be noted that the art has further progressed where it is no longer necessary to use main-frame type computers on-board the field equipment truck. Advances in both areas of soft- and hardware technology now allow the explorationist a choice of numerous mini-and micro-computers for this purpose. Additionally, he is no longer required to generate the activating codes at a remote computer center and transport them on tape to the field location. Codes can now be generated in real time at the field site using the above-identified equipment and it seems possible that in the future this will become the preferred way to generate them.

The discussion here will concern itself with some of the possible options in preparing a code particularly suited for the practice of this invention; a code that results in the injection of a Gaussian, zero mean, stationary signal into the earth. Its duration can be longer than that of conventional "chirp" signals. For discussion purposes, 32 seconds is a possible time interval. The magnetic tape devices used in geophysical prospecting have various sampling intervals. Two milliseconds is a possible choice. Thirty-two seconds of code at a two-millisecond sampling rate require 16,000 random numbers. These may be generated in several ways. One way is to use, in succession, two of the well-known subroutines in the IBM Scientific Subroutine Package: RANDU, to generate a set of uniformly-random numbers, then GAUSS, to convert those numbers into a set with Gaussian distribution. Other ways of generating suitable sets of numbers have been discussed by Lewis in the IBM Systems Journal No. 2 (1969) and by Knuth in his book "Seminumerical Algorithms" (Vol. 2 of the "Art of Computer Programming", Addison Wesley Pub. Co.). However it is done, the desired objective for purposes of this invention is a set of random numbers with a zero mean, Gaussian, stationary vibratory signal.

Another way is to employ a controlled code of preselected characteristics, but which is modified in a fast, feedback mode as a function of the output vibrational signals. Result: irrespective of the characteristics of the control code, the total vibratory system interacts so as to provide the desired Gaussian, zero mean, stationary output signal.

A set of random numbers, 500 per second, may contain, in frequency terms, components up to 250 Hertz, and such frequencies are higher than those usually considered useful in current field vibrator work. So a possible next step is to put the set of random numbers through a digital band-pass filter to restrict the frequency content to a band, say, between 10 and 80 Hz. Many phase characteristics are possible. Minimum phase is preferred, but zero phase may be satisfactory.

The last condition that the code should satisfy in order that the entire method of the present invention will correspond as nearly as practicable to the ideal conditions indicated by Van Vleck's and Bussgang's results, is the condition of "stationarity". Statistical stationarity, by definition, is the maintenance of the same statistical characteristics throughout the time interval of interest. A signal generated as described above has inherent stationarity, e.g. as long as program control parameters are not varied during the time it is activating the vibrator(s). Stationarity of both the source and receiver data is approached as closely as practicable by (1) beginning the actuation of the vibrator(s) long enough before the starting of the recording for transients associated with the impulse response of the earth to die down substantially (e.g., 6 seconds) and (2) continuing the non-impulsive actuation of the vibrators, such as 11, throughout the long-time interval conventional for the vibrations to propagate through the earth are to the receivers, such as 13, in usual Vibroseis ® operations.

It was stated above, without the benefit of any supporting discussion, that the vibratory source(s) should be "substantially linearly-responding" (if controlled by a Gaussian, zero mean, stationary driving code, for example), or the entire vibratory system can interact within itself, to provide the desired Gaussian vibratory output. These conditions for properly carrying out the present invention may require changes from some of the present field practice of vibratory sources. Most conventional vibrators are equipped with automatic feedback mechanisms (e.g., phase-lock-loops) which are usually known as phase compensators. These devices are designed under the assumption that the signal driving the vibrator had a frequency content which is slowly varying in time. Random sweeps clearly do not fit this assumption. Experience has shown that some phase compensators cannot respond quickly enough and have allowed injection of a significantly distorted vibrator output. For example, in one field experiment, a vibrator actually turned itself off and there was no response to a random input. Removal of the phase compensators may be required to make some conventional vibrators operate when driven with random sweeps. However, when phase compensators are removed, automatic compensation for both mechanical differences between different vibrators and for changes in near surface conditions, no longer occurs, and some form of explicit vibrator control is advisable.

EXAMPLE

A simulated field test is illustrative of the method of the present invention. In the simulated test, the receiver group nearest the shot, is offset from the source by 120 ft. Spacing between groups is 30 ft. Each group consisted of 6 receivers spaced 5 feet apart along the direction of survey.

Structure undergoing survey in the present example is a conventional stratigraphic trap that did not rely on structural or tectonic processes to bring about closure, say involving a structure limestone-dolomite trapping of hydrocarbons at a rather shallow depth in the earth.

In one instance, comparitive data is generated using a conventional "chirp" signal of about 16 seconds duration of the form $$F(t) = A(t) \sin 2\pi[at + (b\ t^2)/2] \quad (0 < t < T)$$

where the signal consists of a sinusoidal function of gradually and uniformly increasing frequency—starting at $w_o = 2\pi\ a\ (f_o = a)$ and ending at $w_f = 2\pi\ (a + bT)$. Thus, a sweep going from 10 to 100 Hz in 16 seconds has values of $a = 10$ and $b = 5.6$. The purpose of the function A(t) is to have a multiplying factor in the sinusoidal function so that the sweep does not start or stop abruptly in amplitude.

The spectrum of the system input is assumed to be completely white so the shape of the amplitude spectrum of the received signal is the shape of the earth signal.

In the other instance, the spectrum of system output is Gaussian, zero mean, and stationary. Duration: 16 seconds long. Sample rate: 2 milliseconds. The sweep is generated by passing a random number sequence generated with RANDU and GAUSS through a zero phase filter. The amplitude response of the filter increases linearly from 0 Hz to 125 Hz at a rate of 12 db/octave. Above 125 Hz the filter amplitude response decreases linearly at a rate of 72 db/octave.

Both sets of data are correlatable. I.e., to say a full amplitude representation of the conventional "chirp" signal is cross-correlatable with the clipped signal received at each receiver group. Similarly, the full-wave representation of the Gaussian, zero mean, stationary sweep signal is cross-correlatable with the zero-memory, non-linearly clipped receiver signal of each receiver group.

After comparisons of the sets of synthetic data are made, it is evident that the data developed by the method of the present invention is far superior to that provided by the more conventional "chirp" method. Better resolution of adjacent waveform changes (in the traces provided by the method of the present invention) is the main advantage. Hence there is strong evidence that the present method, although it has the channel-capacity economy of sign-bit recording at either the sources and receivers, provides final records that are superior to final processed records obtained using a conventional "chirp" signal, especially for indicating the presence of stratigraphic traps.

From this point on, the discussion will be concerned with refinements and variations not necessary to make the basic method operable, but may be desirable for optimum performance.

Figure 3:
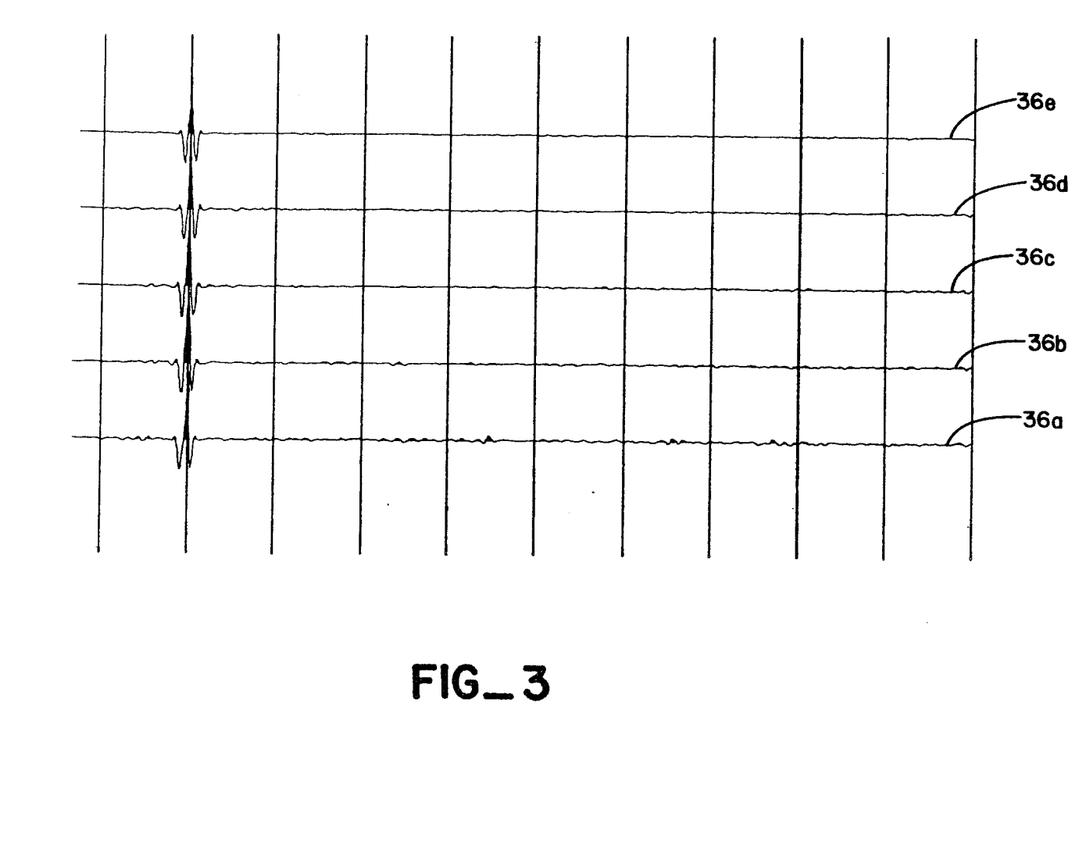
FIG. 3 shows a sequence of auto-correlations, first that of one random sweep, then a sum of the auto-correlations of two different random sweeps, then a sum of the auto-correlations of 4, then 8, then 16 different random sweeps.

Sometimes in vibrator seismology, in order to increase the effective signal-to-noise ratio, it is desirable to make repetitive sweeps and add the records from the successive repetitions expecting that desired signals will be reinforced and the noise will tend to cancel itself out. When Gaussian, zero mean, stationary sweeps are being used, and such repetitions are made, it is desirable to use a different time sequence of vibrations for each repetition. FIG. 3 illustrates this, using autocorrelated random sweeps recorded as traces 36a, 36b, 36c, 36d, and 36e. Trace 36a is the auto-correlation from a single sweep. The other traces 36b, 36c ... 36e are the sums of the auto-correlations of successively 2, 4, 8, and 16 different sweeps. (The vertical lines are 100 millisecond timing lines.) The events seen in addition to the main peak are due to correlation noise. Since the correlation noise of any one sweep is different from that of any other sweep, the level of this noise decreases as more sweeps are summed.

Some of the variations and alternatives in the method of the present invention are illustrated in FIG. 4. Alternate data paths are shown along which signal information may flow during practice of the method. The original Gaussian code from the sweep generator 15 may flow through filter 37 on its way to the vibrator 11, or it may not, depending on the state of switch 38a. The same code may or may not flow through filter 39, depending on switch 38b but any event the code itself passes by way of zero-memory, non-linear device 16. Subsequently, the zero-memory, non-linear clipped signal passes to the correlator and recorder unit 18. Representations of the full-wave received signals are seen to pass unclipped into the recorder unit 18. Within unit 18, the multi-bit correlation functions go directly to form the final record.

AN EMBODIMENT OF THE INVENTION THAT RECOVERS RELATIVE AMPLITUDES

In currently practiced exploration seismology there is seldom a need to know the absolute amplitudes of the recorded vibrations. However, in some instances of exploration seismology there is indeed sometimes a need to know the relative amplitudes among seismic traces, e.g., when three-component geophones are being used in order to determine the direction of wave travel. Relative amplitudes need to be known also when changes in reflectivity are to be evaluated as functions of offset. In the case where the received signals are subject to a non-linearly operation such as clipping, e.g. FIG. 1, it is necessary to extend the method of the present invention to enable relative amplitudes between traces to be determined. In this regard, incorporation by reference is made to my copending application, particularly FIG. 5 and accompanying text.

In the following description it will be understood that the traces whose relative amplitudes are desired to be known are the final, cross-correlation traces. In accordance with previous teachings in this specification it is known, through my unique application of Van Vleck's and Bussgang's results, that those cross-correlation traces are accurate representations of the original seismic information except for the loss of a scaling factor. All the correlation traces have been "normalized" and are missing an unknown overall multiplier.

A small modification of circuitry within processing and recording unit 17 of FIG. 1, permits the recovery of additional information that enables the desired relative amplitudes to be recovered.

Figure 5:
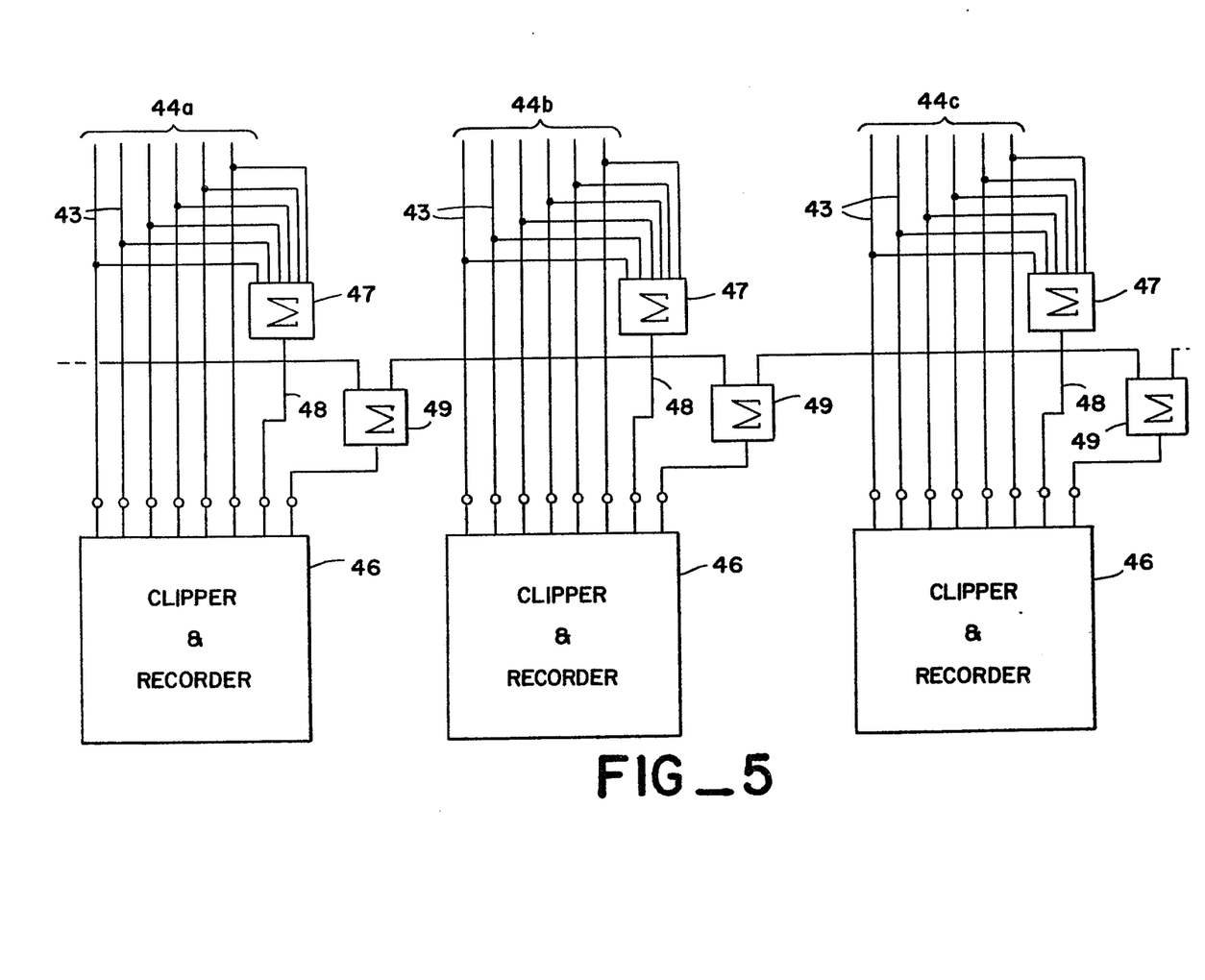
FIG. 5 represents optional, additional circuitry by which relative trace amplitudes can be recovered using the processing and recording means of FIG. 1.

Reference is now made to FIG. 5. In FIG. 5, signal channels 43 from a plurality of detector groups (or possibly in some field experiments, from individual detectors) are shown. Channels 43 are divided into subsets 44a, 44b, 44c, each of which, as seen in FIG. 5, consists of six of said channels per subset, although they could consist of as few as two channels, or as many as a thousand, conceptually. Before each subset of channels 43 is fed into a series of clipper and recorder units 46, signals of such a subset are summed at a summer 47 and fed via an auxiliary channel 48 to clipper and recorder unit 46. The sum signal in each auxiliary channel is clipped and recorded alongside the signals from the channels in each subset. So, in the latter cross-correlations there will be, for each subset of six traces with six unknown multipliers, a seventh trace, also with an unknown multiplier.

Now, if attention is fixed on any particular point in time along the above-indicated seven correlations, it will be appreciated that one can obtain six multibit amplitude values from the subset traces and one multibit value from the auxiliary trace that is the sum of the multibit values from the subset traces. Proceeding then, one by one, to five more, different points in time, one can obtain, for each point in time, six more multibit values from the subset traces and one more multibit value from the auxiliary trace. It will be appreciated by those skilled in exploration seismology that from just these six points in time, one can form a set of six simultaneous equations to solve for the ratios of all the unknown subset trace multipliers to the unknown auxiliary trace multiplier, and that this is tantamount to solving for the relative amplitudes between the subset traces.

Under actual exploration conditions when all the traces are burdened with noise, it is better practice to use more time points than there are subset traces to obtain redundant sets of equations, many more equations than unknowns, and to solve the redundant sets, e.g., by least squares methods, to obtain statistically confident values of the unknown multipliers. (Methods of solving redundant sets of linear equations are discussed by many authors, e.g., G. P. Barnard: "Modern Mass Spectrometry", The Institute of Physics (London) 1953, p. 214–230).

It will be appreciated that the prescription immediately above for solving for the relative amplitudes in a subset of traces falls short of telling how to handle a multiplicity of such subsets so that all the relative amplitudes between all the traces become known. To make this final step a second auxiliary channel of data needs to have been recorded. Reference is made again to FIG. 5, which shows additional summers 49 between the subsets 44a, 44b, 44c, which sum the sums of the adjacent subsets. By an obvious extension of the reasoning already given, it can be seen that the relative amplitudes of all the subset sums can be determined from the sums of the sums. It then becomes apparent that all the relative amplitudes between all the traces in any given number of traces can be determined by this scheme of summing subsets and summing the sums of the subsets.

It is now apparent that a method of seismic exploration has been described that has the channel-capacity economy of sign-bit recording, at either the sources and receivers, without the sacrifice of any of the usually desired seismic information in the final processed records. If the received signals are non-linearly clipped, even the relative amplitudes between traces can be recovered. The phrase "channel-capacity economy" is used in several places in this specification. To those skilled in the art, this phrase implies more than the mere numerical factor of 16 that is explicit in the contracting designations, "16-bit recording" and "sign-bit recording". From information theory it is known that when fewer bits per second need to be transmitted over any information channel, other advantages ensue, some of which may be traded off against each other.

A lower bit-per-second requirement makes it possible to reduce either the usable bandwidth of an information channel, or if it is more advantageous, the effective signal-to-noise ratio.

The invention is not limited to the specific embodiments described above, because variations will be readily apparent to those skilled in the art. For example, marine use of the method of the present invention is also readily foreseeable where a control code is used to generate hydraulic pressure signals for changing the position of flexible diaphragms of a semi- or submerged vibratory source, so as to generate the desired Gaussian, zero mean, stationary vibratory output of the present invention, in an operationally continuous manner. By the term "operationally continuous manner", it is meant that instead of such marine system having distinct activation and recording periods (as conventionally found in marine operations), time durations of each such activity continuously overlap and are indistinct from each other over the entire collection workday. That is to say, as the boat traverses, its assigned survey legs and the source are continuously activated to provide the Gaussian, zero mean, stationary vibrations of the present invention, the receivers likewise continuously record all received signals. Thus, the invention is to be given the broadest possible interpretation within the terms of the following claims.

What is claimed is:

1. A method of seismic surveying using non-impulsive vibratory sources that recovers all the essential information of full waveform recording in a distortion-free manner which comprises:
   A. injecting non-impulsive, Gaussian, zero mean, stationary seismic vibrations into the earth by activating at least one vibratory source with a driving code of preselected characteristics;
   B. recording a zero-memory, non-linear representation of the seismic vibrations that have propagated through the earth from said at least one vibratory source to at least one receiver; and
   C. cross-correlating a waveform preserved representation of said injected Gaussian, zero mean, stationary vibrations with said zero-memory, non-linear representation of the received seismic vibrations; the result of said cross-correlation being a seismic survey record that is essentially distortion-free.

2. The method of claim 1, in which the time duration of said seismic vibrations is continuous throughout the time interval in which said propagated seismic vibrations are received, and essentially is equal to that for a conventional "chirp" signal.

3. The method of claim 1, in which when Steps A to C are repeated, a different time sequence of Gaussian, zero mean, stationary seismic vibrations is used for each time said steps are repeated.

4. The method of claim 1, in which said driving code is a Gaussian, zero mean, stationary code that is filtered before said code is used to drive said vibratory source, through a filter selected from the class consisting of minimum-phase band-pass filters and zero-phase band-pass filters.

5. The method of claim 1, in which said driving code is a Gaussian, zero mean, stationary code that is filtered before said code is used to drive said vibratory source and also before said code is recorded, through a filter selected from the class consisting of mininum-phase band-pass filters and zero-phase band-pass filters.

6. The method of claim 1, in which a multiplicity of seismic receivers is used, and a corresponding multiplicity of signal channels leads toward a recorder, with the following adjuncts to Step B:
   i. dividing said multiplicity of signal channels into subsets, each subset consisting of at least two of said channels; and
   ii. by using at least one auxiliary channel for each subset, recording in sign-bit form the sum of the signals within each subset.

7. The method of claim 1, in which a multiplicity of seismic receivers is used, and a corresponding multiplicity of signal channels leads toward a recorder, with the following adjuncts to Step B:
   i. dividing said multiplicity of signal channels into subsets, each subset consisting of at least two of said channels;
   ii. by using at least one auxiliary channel for each subset, recording in sign-bit form the sum of the signals within each subset; and
   iii. by using at least one other auxiliary channel for each subset, recording in sign-bit form the compound sum comprising the sum of the signals within the subset itself and the sum of the signals from an adjacent subset.

8. The method of claim 1, in which a multiplicity of seismic receivers is used, and a corresponding multiplicity of signal channels leads toward a recorder, with the following adjuncts to Step B:
   i. dividing said multiplicity of signal channels into subsets, each subset consisting of at least two of said channels;
   ii. by using at least one auxiliary channel for each subset, recording in sign-bit form the sum of the signals within each subset; and
   iii. by using at least one other auxiliary channel for each subset, recording in sign-bit form the compound sum comprising the sum of the signals within the subset itself and the sum of the signals from another subset in such a manner that the sum of the traces in each subset contributes to at least two said compound sums.

9. A method of seismic surveying using non-impulsive vibratory sources, said method having the channel capacity economy without sacrifice of essential seismic information in the seismic record which comprises:
   A. generating a Gaussian, zero mean, and stationary code;
   B. filtering said code through a filter selected from the class consisting of minimum-phase band-pass and zero-phase band-pass;
   C. driving at least one substantially linearly-responding seismic vibratory source with the resultant filtered code to inject non-impulsive, Gaussian, zero mean, stationary signals into the earth for a time interval longer than the recording interval of the resultant seismic waves;
   D. recording a zero-memory, non-linear representation of the seismic signals detected by at least one receiver positioned to detect said resultant seismic waves;
   E. recording a waveform-preserved representation of said Gaussian, zero mean, stationary code without filtering thereof; and
   F. cross-correlating said waveform-preserved representation of said code with said zero-memory, non-linear representation of said detected seismic signals; the result of said cross-correlating being a seismic record that is essentially distortion-free.

10. The method of claim 9, in which Steps A to F are repeated, and a different time sequence of Gaussian, zero mean, stationary seismic vibrations is used for each time said steps are repeated.

11. The method of claim 10 in which a multiplicity of seismic receivers is used, and a corresponding multiplicity of signal channels leads toward a recorder, with the following adjunct to D:
   i. dividing said multiplicity of signal channels into subsets, each subset consisting of at least two of said channels; and
   ii. by using at least one auxiliary channel for each subset, recording in clipped form the sum of the signals within each subset.

12. A method of seismic surveying using at least one non-impulsive vibratory source that recovers all essential information of full waveform recording which comprises:
   A. injecting non-impulsive, Gaussian, zero mean, stationary seismic vibrations into the earth by activating at least one vibratory source with a driving code of preselected characteristics;

B. recording a zero-memory, non-linear representation of said injected vibrations;
C. recording a waveform-preserved representation of the seismic vibrations that have propagated through the earth from said at least one vibratory source to at least one receiver; and
D. cross-correlating said zero-memory, non-linear representation of said injected Gaussian, zero mean, stationary vibrations with said waveform-preserved representation of the recording of said propagated seismic vibrations by said receiver; the result of said cross-correlation being a seismic survey record essentially distortion-free and particularly useful in stratigraphic trap determination.

13. A method of seismic exploration having the channel-capacity economy of sign-bit recording of the received full waveform sinusoidal seismic signals without sacrifice of essential seismic information in the seismic record which comprises:
A. generating a Gaussian, zero mean, stationary code;
B. driving at least one substantially linearly-responding vibratory source with said code to inject non-impulsive seismic vibrations into the earth;
C. recording a zero-memory, non-linear representation of the seismic vibrations propagated through the earth from said source and detected by at least one receiver;
D. recording a waveform-preserved representation of said Gaussian, zero mean, stationary code before, during or after said code is used to drive said vibratory source; and
E. cross-correlating said zero-memory, non-linear representation of said received seismic vibrations with said waveform preserved representation of said Gaussian, zero mean, stationary code; the result of said cross-correlation being a seismic exploration record that is essentially distortion-free and particularly useful in stratigraphic trap determination.

* * * * *